(No Model.) 2 Sheets—Sheet 1.

L. JEFFERY.
PANORAMIC CAMERA.

No. 586,097. Patented July 13, 1897.

Witnesses
Guy E. Davis
O. W. Miller

Inventor
Louis Jeffery
By his Attorneys
Baldwin Davidson & Wight (No Model.) 2 Sheets—Sheet 2.

L. JEFFERY.
PANORAMIC CAMERA.

No. 586,097. Patented July 13, 1897.

Witnesses
Guy E. Davis
J. W. Miller

Inventor
Louis Jeffery
By his Attorneys
Baldwin Davidson & Wight

UNITED STATES PATENT OFFICE.

LOUIS JEFFERY, OF LONDON, ENGLAND.

PANORAMIC CAMERA.

SPECIFICATION forming part of Letters Patent No. 586,097, dated July 13, 1897.

Application filed October 12, 1896. Serial No. 608,575. (No model.)

*To all whom it may concern:*

Be it known that I, LOUIS JEFFERY, dentist, a subject of the Queen of Great Britain, residing at 1 Newton Villas, Finsbury Park, London, in the county of Middlesex, England, have invented certain new and useful Improvements in Photographic Cameras for Taking Panoramic Views, of which the following is a specification.

The object of my invention is to provide a photographic camera which can be utilized to take panoramic views. To this end I mount the camera on a stand with a circular top, around the center of which the camera can be turned at a uniform speed. Means are provided for driving the film and for pressing it against the edge of the circular top of the stand, so that the movement of the film is made to revolve the camera. While the camera is making a revolution the sensitive film on which the picture is taken is passed in front of an aperture in a diaphragm within the camera.

Figure 1:
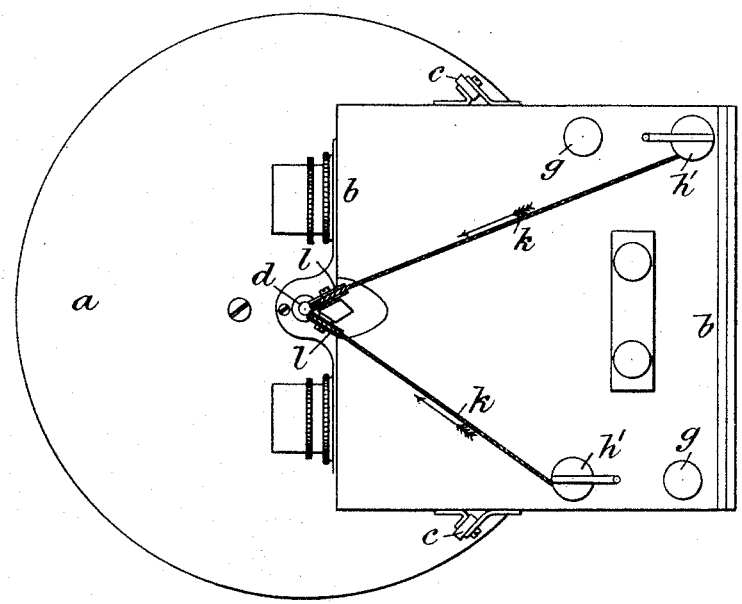
Figure 2:
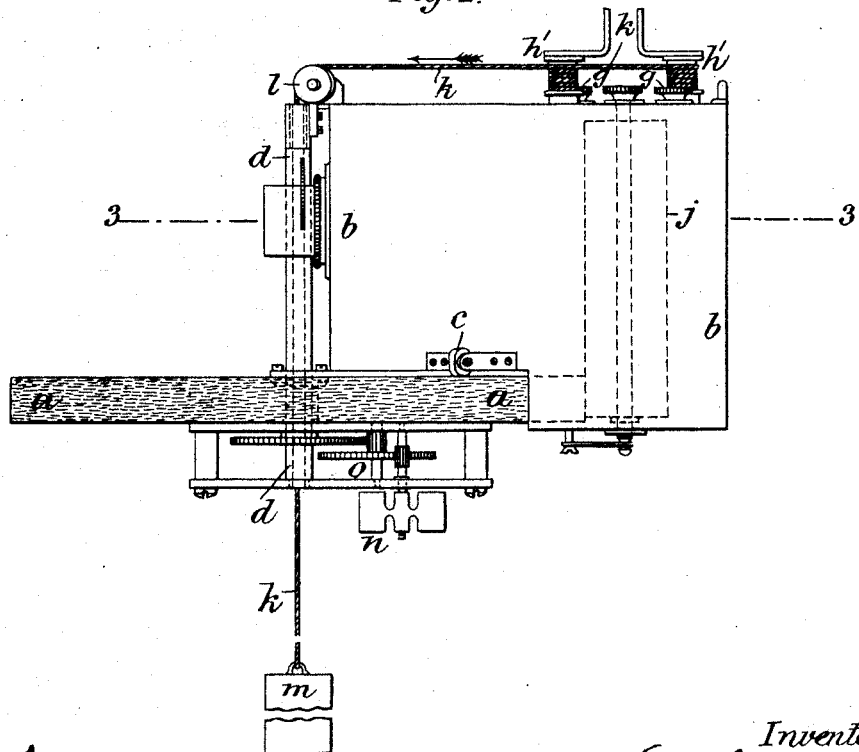
Figure 3:
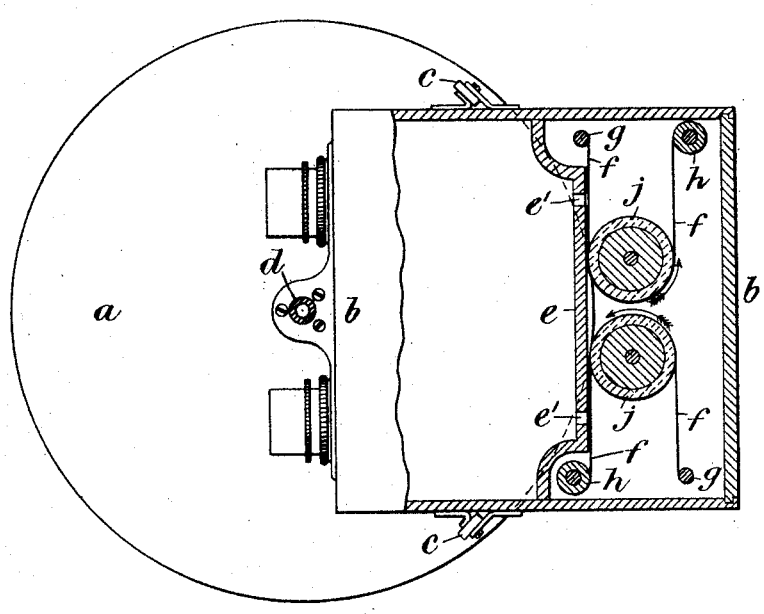

Figure 1 is a plan, Fig. 2 a side elevation, and Fig. 3 a horizontal section on the line 3 3, Fig. 2, of a double camera constructed according to this invention.

$a$ is a disk having a roughened edge and supported on a stand or legs, which are not shown.

$b$ is the camera, supported on rollers $c\ c$, running on the disk $a$, and by the hollow vertical shaft $d$, which works in a bearing at the center of the disk.

$e$ is a diaphragm in the camera, and $e'\ e'$ are slots in it.

$f\ f$ are the sensitive films, which when the camera is in use are wound off from the bobbins $g\ g$ onto the bobbins $h\ h$, passing around the rollers $j\ j$, covered with india-rubber, and past the slots $e'\ e'$.

$h'\ h'$ are reels or pulleys at the top of the bobbins $h\ h$, upon which the cords $k\ k$ are wound. These cords pass over pulleys $l\ l$ at the top of the shaft $d$, down through the shaft, and are connected to a weight $m$. This weight in falling turns the bobbins $h\ h$, winding up the films $f$ on them, and the films being nipped between the rollers $j$ and the roughened edge of the disk $a$ drive the camera around the disk, and one of them is also strained tight between the roller and the bobbin $h$ by reason of the revolution of the camera being retarded by a fly $n$, driven from the shaft $d$ by a train of clockwork $o$, or, it might be, from the edge of the disk. The other film is kept strained between the roller $j$ and the bobbin $g$ by reason of the friction of the latter in its bearings.

The diameter of the disk $a$ is so proportioned that the image of any object shall travel at the same speed as, and therefore remain stationary relatively to, the film.

What I claim is—

1. The combination with the disk, of means for driving the film for pressing it against the edge of the disk and for retarding the revolution of the camera.

2. The combination of the disk, the camera free to revolve about the center of the disk, a bobbin on which the film is wound after exposure, means for driving this bobbin, a roller pivoted in the camera and pressing the film against the edge of the disk and means tending to retard the revolution of the camera.

3. The combination of the disk, the camera free to revolve about the center of the disk a bobbin on which the film is wound after exposure a cord wound on the bobbin and attached to a weight, a roller pivoted in the camera and pressing the film against the edge of the disk and a fly driven by the camera.

4. The combination of the stationary disk, the camera pivotally connected with the disk and mounted to revolve about the center thereof, and means for driving the film and causing it to press against the edge of the disk and thereby to revolve the camera.

LOUIS JEFFERY.

Witnesses:
W. PERCY CARPMAEL,
JOHN H. WHITEHEAD.